(12) United States Patent
Kegel et al.

(10) Patent No.: US 10,938,196 B2
(45) Date of Patent: Mar. 2, 2021

(54) ELECTRIC POWER SUPPLY SYSTEM FOR A VEHICLE FLEET

(71) Applicant: Deere & Company, Moline, IL (US)

(72) Inventors: Volker Kegel, Mannheim (DE); Nicolai Tarasinski, Frankenthal (DE); Julian Daubermann, Mannheim (DE); Simon Pfaffmann, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 120 days.

(21) Appl. No.: 16/135,731

(22) Filed: Sep. 19, 2018

(65) Prior Publication Data
US 2019/0103739 A1  Apr. 4, 2019

(30) Foreign Application Priority Data

Sep. 29, 2017 (DE) .......................... 102017217481.1

(51) Int. Cl.
| | | |
|---|---|---|
| *H02G 11/02* | (2006.01) | |
| *B60L 9/00* | (2019.01) | |
| *H02G 11/00* | (2006.01) | |
| *H02G 3/04* | (2006.01) | |
| *H04B 3/02* | (2006.01) | |

(52) U.S. Cl.
CPC .............. *H02G 11/02* (2013.01); *B60L 9/00* (2013.01); *H02G 3/0456* (2013.01); *H02G 11/003* (2013.01); *H04B 3/02* (2013.01)

(58) Field of Classification Search
CPC .... H02G 11/003; H02G 11/02; H02G 3/0456; B60L 9/00; H04B 3/02
See application file for complete search history.

(56) References Cited

U.S. PATENT DOCUMENTS

| 4,071,124 A | 1/1978 | Price | |
| 2014/0027228 A1* | 1/2014 | Tojima | E02F 9/2095 |
| | | | 191/12.2 A |

FOREIGN PATENT DOCUMENTS

| DE | 645517 C | 5/1937 | |
| DE | 60106684-D1 | * 12/2004 | ............. B66C 13/14 |
| DE | 60106684 T2 | 2/2006 | |
| DE | 102015202259 A1 | 8/2016 | |
| EP | 1172322 | 1/2002 | |
| GB | 801770 A | 9/1958 | |

OTHER PUBLICATIONS

German Search Report issued in counterpart application No. 102017217481.1 dated May 24, 2018. (12 pages).

European Search Report issued in counterpart application No. 18196950.2 dated Feb. 22, 2019 (10 pages).

* cited by examiner

*Primary Examiner* — Jared Fureman
*Assistant Examiner* — Duc M Pham

(57) ABSTRACT

An electric power supply system for a vehicle fleet includes a first base station configured to be attached to a first fleet vehicle and a second base station configured to be attached to a second fleet vehicle. A carrier rope spans between the first and second base stations. The carrier rope is variable in length. A cable is operably run in loops on the carrier rope such that the cable has a fixed length. The cable is operably run via holding elements positioned along the carrier rope.

19 Claims, 2 Drawing Sheets

ELECTRIC POWER SUPPLY SYSTEM FOR A VEHICLE FLEET

RELATED APPLICATIONS

This application claims priority to German Patent Application Ser. No. 102017217481.1, filed Sep. 29, 2017, the disclosure of which is hereby incorporated by reference in its entirety.

FIELD OF THE DISCLOSURE

The present disclosure relates to an electric power supply system for a vehicle fleet.

BACKGROUND

Conventional concepts for supplying vehicles with electrical energy provide for the use of rechargeable vehicle batteries. Owing to the high power densities required, particularly in the case of agricultural or construction machinery, alternative concepts are also being pursued in which the electric power is carried by a feeder to the utility vehicle to be supplied. The possibility exists in this case to assign to the utility vehicle a cable drum having thereon an electrical feeder that can be connected to a stationary energy supply station. Since the utility vehicles concerned are frequently operated in vehicle fleets, or form a fleet group for the purpose of performing work operations that are coordinated to each other, if energy is supplied to the utility vehicles by a feeder there is a need for a feeder routing that is correspondingly mutually coordinated.

Thus, there is a need for an electric power supply system adapted to use in a vehicle fleet.

SUMMARY

In a first embodiment of the present disclosure, an electric power supply system for a vehicle fleet comprises a first base station that can be attached to a first fleet vehicle, and a second base station that can be attached to a second fleet vehicle, there being spanned between the two base stations a carrier rope that is variable in length and on which an electric power cable or data transmission cable is run in loops, of fixed length in each case, by means of holding elements that are displaceable along the carrier rope.

In this way it is possible, by means of the carrier rope, to support the electric power cable or data transmission cable above the ground and thus out of the reach of mechanical influences. Since the tensile forces acting between the two fleet vehicles are taken up by the carrier rope, no particular demands in this regard are made on the mechanical loading capacity of the electric power cable or data transmission cable. In operation, the length of the carrier rope can be freely adapted in the range between a minimum distance to be maintained from the two fleet vehicles and a maximum distance defined by the total length of the electric power cable or data transmission cable, making it possible to appropriately take account of dynamic travel or turning maneuvers of the fleet vehicles. The electric power cable or data transmission cable in this case is supported by means of the holding elements so as to be displaceable along the carrier rope such that it hangs down in loops to a greater or lesser extent, depending on the length of the carrier rope. In the least favorable case, the length of the loops hanging down is half the cable length provided in each case between the holding elements. This must be taken into consideration in determination of the attachment point of the carrier rope to the fleet vehicles, this point typically being located at a distance of approximately 4 meters above the ground. The carrier rope, or the two base stations, in this case may be attached to masts connected to the fleet vehicles.

The electric power cable or data transmission cable is usually realized as a multicore copper or aluminum cable, which may have optical or coaxial conductors for broadband data transmission, or real-time data communication. The coaxial conductor may be an Ethernet cable. To make it possible to dispense with the use of elaborate rotary contacts for data transmission in the case of use of a winding drum, it is conceivable to assign to the winding drum a (co-rotating) data transceiver that is connected to a communication unit of the first fleet vehicle via a wireless data exchange connection, in order for the data transmitted to this communication unit to be fed into the optical or coaxial conductor by means of a corresponding interface, or for data transmitted via the latter to be received. In order to ensure the greatest possible movement clearance of the two fleet vehicles in relation to each other, the first base station is attached in a rear region of the first fleet vehicle, and the second base station in a front region of the second fleet vehicle.

For completeness, it is noted that the electric power supply system can be expanded by any number of additional fleet vehicles, at least one of the fleet vehicles being equipped with means for establishing an electric power supply connection to a stationary energy supply facility that is located, for example, in the form of a transformer substation at the edge of a field to be worked. The means for establishing an electric power supply connection may be a cable drum, such as that known from DE 10 2015 202 259 A1.

The holding elements are sliding or rolling guides, to which a respective loop end of the electric power cable or data transmission cable is fixedly attached. The sliding or rolling guides are composed, in particular, of metal or high-strength plastic, the electric power cable or data transmission cable being clamped thereto in the region of an outer sheath. Which of the two preceding designs is selected, depends, inter alia, on the weight of the electric power cable or data transmission cable to be carried by the holding elements.

Furthermore, for the purpose of altering the length of the carrier rope, the first base station comprises a winding drum that can be motor-driven. The winding drum has a drum body for holding the carrier rope, and the drum body can be put into rotation as a result of a motor drive being triggered to reel-up or unreel the carrier rope. The motor drive is typically realized as an electric geared motor. A device for torque control that acts in combination with the electric geared motor enables a predefined rope tension to be maintained, such that excessive slack of the carrier rope between the fleet vehicles can be avoided.

A rotary position transducer, for acquiring a drum rotation executed by means of the motor drive, may be assigned to the winding drum, a control unit extrapolating, from the number of acquired drum rotations, a current distance between the two base stations. This distance information may be used, inter alia, for acquiring the relative movement of the two fleet vehicles and, by appropriate intervention in an autonomous vehicle control system, coordinating the relative movement as required. On the other hand, the relative distance of the two base stations that is obtained from the distance information may also be compared with the available total length of the carrier rope, or of the electric power cable or data transmission cable and, if a maximum distance, that to that extent is to be maintained, will imminently be exceeded, appropriate counter-measures can be implemented to avoid damage to the carrier rope or to the electric power cable or data transmission cable. These measures may include, besides the output of an operator alarm, a correcting intervention in the autonomous vehicle control system, possibly in the form of an automatically initiated emergency stopping of the fleet vehicles.

In particular, it is also possible for a separable connection means, for coupling and decoupling the carrier rope and the electric power cable or data transmission cable, to be provided on the second base station. The connection means typically comprises a mechanical coupling for separably attaching the carrier rope, or a coupling socket for establishing a separable electrical connection to a coupling plug arranged on the electric power cable or data transmission cable.

A switching transducer arrangement, for identifying a coupling state of the carrier rope and of the electric power cable or data transmission cable, may be assigned to the connection means. In this case it is conceivable that operation of the fleet vehicles is enabled solely if it is established, on the basis of the identified coupling state, that both the carrier rope and the electric power cable or data transmission cable are attached, in the manner stipulated for use, by means of the connection means.

The switching transducer arrangement is, for example, an arrangement of mechanical contact switches or contactlessly operating induction switches, which are actuated upon the carrier rope being attached to the mechanical coupling, or upon establishment of the electrical connection between the coupling plug and coupling socket, and which provide coupling-state information ensuing from the respective switching state.

Additionally or alternatively, the first base station may have a dummy connection element for storing, during transport, a coupling plug provided on the electric power cable or data transmission cable. This is pertinent, inter alia, if the fleet group is broken up in order to bring the fleet vehicles to the next deployment location. In the simplest case, the dummy connection element is a blind socket, without electrical function, that is compatible with the coupling plug, and to which the coupling plug of the electric power cable or data transmission cable can be separably attached. This allows the coupling plug to be secured against damage caused by movement during transport, and at the same time a housing comprised by the blind socket protectively surrounds the contact elements of the coupling plug.

A switching transducer may be assigned to the dummy connection element, for identifying a coupling plug attached thereto. It may be provided in this case that operation of the first fleet vehicle is enabled solely if it is established that the coupling plug is secured on the dummy connection element realized as a blind socket.

The switching transducer may be, for example, a mechanical contact switch that is built into the blind socket, or a contactlessly operating induction switch that is actuated by the coupling plug attached to the blind socket.

The carrier rope is normally composed of a multiplicity of metal wires or high-strength plastic fibers. In the latter case, a thinner and lighter carrier rope can be realized, as compared with the use of metal wires, for the same tensile loading capacity, which allows a correspondingly greater stock of rope to be accommodated on the winding drum. The plastic fibers are generally aramid fibers or Kevlar fibers, the insulating properties of which additionally offer increased protection in respect of lightning strokes.

To increase the safety distance in respect of the current-carrying electric power cable or data transmission cable, a drag chain is attached to at least one of the two base stations, the carrier rope being fastened to a free drag chain end by means of the winding drum, or to the separable connection means. In this way, the drag chain forms a spacer between the respective fleet vehicle and the electric power cable or data transmission cable, since the distance between the fleet vehicle and the hanging down loops of the electric power cable or data transmission cable is increased by the length of the drag chain.

Unlike a conventional link chain, the drag chain is composed of a multiplicity of concatenated segments, which are pivotally connected to each other via intermediate hinges, or joints. The hinges, or joints, may be designed in such a manner that a minimum radius, defined by the admissible flexural stress of the electric power cable or data transmission cable guided in the drag chain, cannot be undershot. The hinges, or joints, are realized cardanically, such that the drag chain is able to follow the movements of the carrier rope in any pivoting direction.

With regard to the realization of an autonomous vehicle control system, for example, as part of a higher-order fleet management system, it is important to know the spatial orientation of the fleet vehicles in relation to each other, in addition to their relative movement. It is therefore conceivable that there is a sensor device for acquiring a spatial course of the carrier rope relative to the first or second base station, the control unit extrapolating, from the acquired spatial course of the carrier rope, the spatial orientation of the fleet vehicles in relation to each other. In the simplest case, the sensor device may be an angle sensor that is assigned to the respective base station and that senses the orientation of a contact feeler. Should a drag chain be provided, a separate angle sensor may be assigned to each of the hinges, or joints. This takes account of the fact that the drag chain, owing to the limited mobility of the individual segments, does not necessarily have a straight course that follows the carrier rope, such that the actual course of the carrier rope relative to the respective fleet vehicle could not be extrapolated by acquisition of the orientation of only a single one of the segments. If there is a separate angle sensor assigned to each of the hinges, or joints, it is possible at the same time, in the region of the drag chain, to monitor the minimum radius of bend to be maintained for the electric power cable or data transmission cable. If necessary, appropriate counter-measures cab be taken to avoid kinking of the electric power cable or data transmission cable, on the basis of correcting interventions in the autonomous vehicle control system.

Furthermore, it is conceivable that, following the decoupling of the electric power cable or data transmission cable, the holding elements can be stowed on the first base station. For this purpose, following separation of the electric plug-in connection, the holding elements can be slid into one another along the carrier rope and locked by means of a securing element in an end position provided on the first base station. The mechanical coupling of the carrier rope is then separated, and the latter is reeled-up onto the winding drum.

In order to simplify the stowage of the comparatively heavy electric power cable or data transmission cable (which typically weighs up to 150 kg), the holding elements, following the decoupling of the electric power cable or data transmission cable, can be stowed on the first base station by means of a return device. The return device comprises a return rope that is connected to the outermost holding element and that can be reeled-up onto a further winding drum that can be motor-driven, the outermost holding element taking the inner holding elements along its path in the direction of the end position on the first base station, where it can be locked in place.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
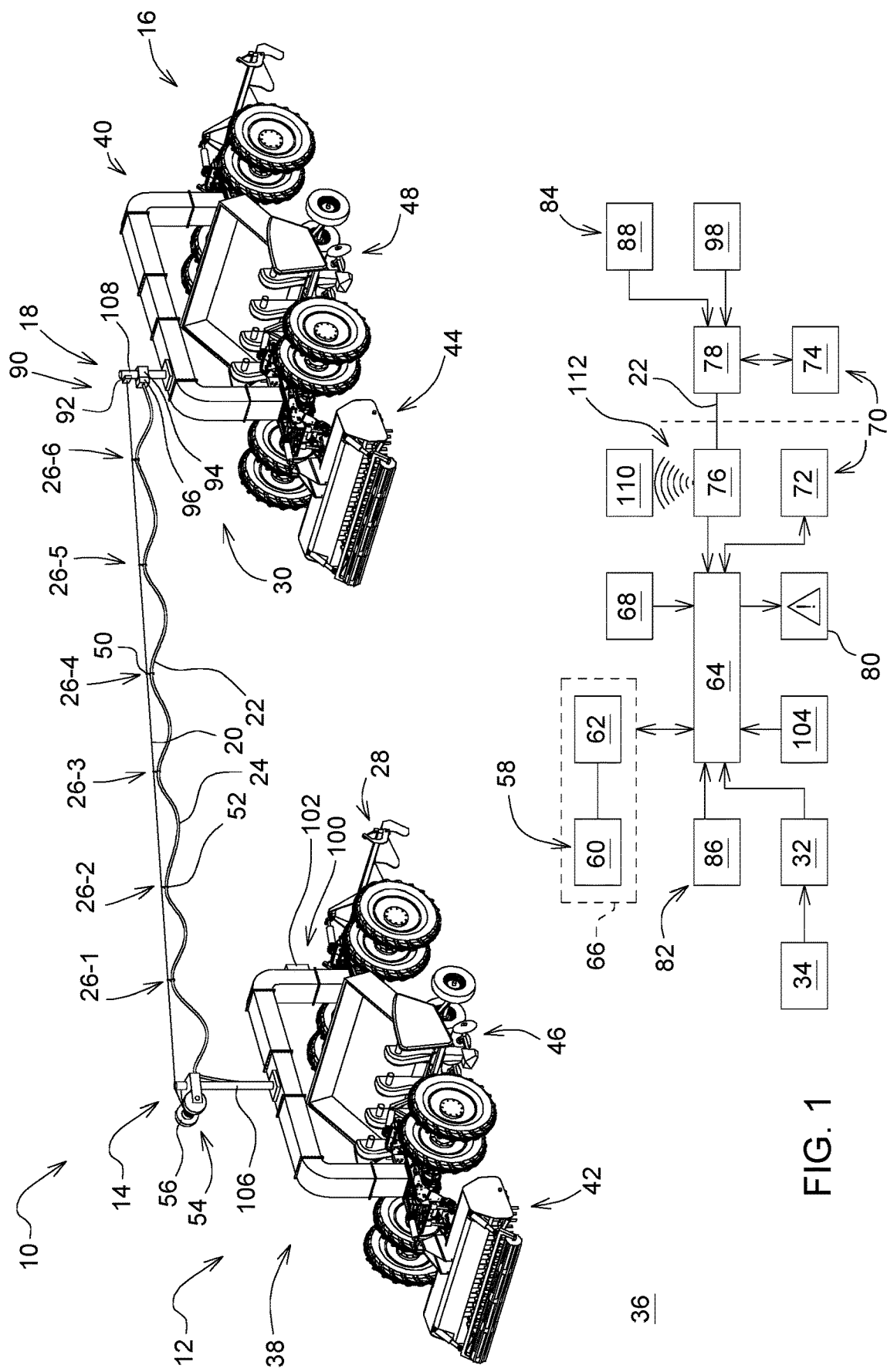
FIG. 1 is a schematic of a first embodiment of an electric power supply system for a vehicle fleet.

FIG. 1 shows a first embodiment of an electric power supply system 10 for a vehicle fleet. The electric power supply system 10 includes a first base station 14 attached to a first fleet vehicle 12 and a second base station 18 attached to a second fleet vehicle 16. The first fleet vehicle 12 forms a lead vehicle, and the second fleet vehicle 16 forms a following vehicle, controlled or monitored by the latter, within the vehicle fleet represented in FIG. 1. Spanned between the two base stations 14, 18 is a carrier rope 20 that is variable in length and on which an electric power cable or data transmission cable 22 is run in loops 24, of fixed length in each case, by means of holding elements 26-1, . . . , 26-6 that are displaceable along the carrier rope 20. The first base station 14 is attached in a rear region 28 of the first fleet vehicle 12, and the second base station 18 is attached in a front region 30 of the second fleet vehicle 16.

At least one of the fleet vehicles 12, 16 is equipped with means for establishing an electric power supply connection 32 to a stationary energy supply facility 34 that is located, for example, in the form of a transformer substation at the edge of a field 36 to be worked. The means for establishing an electric power supply connection 32 is, for example, a cable drum, such as that known from DE 10 2015 202 259 A1.

As an example, the vehicle fleet represented in FIG. 1 consists of only two fleet vehicles 10, 16, but for completeness it is noted that the electric power supply system 10 can be expanded to any number of additional fleet vehicles.

In the present embodiment, the fleet vehicles 12, 16 are realized as autonomously driving agricultural tractors 38, 40, to which various agricultural accessory appliances 42, 44, 46, 48 can be attached. The latter are illustrated in FIG. 1 by a grubber, having a following sowing unit.

The holding elements 26-1, . . . , 26-6 are sliding or rolling guides 50, of identical structure in each case, to which a respective loop end 52 of the electric power cable or data transmission cable 22 is fixedly attached. The sliding or rolling guides 50 are composed of metal or high-strength plastic, the electric power cable or data transmission cable 22 being clamped thereto in the region of an outer sheath. Which of the two preceding designs is selected, depends, inter alia, on the weight of the electric power cable or data transmission cable 22 to be carried by the holding elements 26-1, . . . , 26-6.

Furthermore, for the purpose of altering the length of the carrier rope 20, the first base station 14 comprises a winding drum 54 that can be motor-driven. The winding drum 54 has a drum body 56 for holding the carrier rope 20, and the drum body 56 can be put into rotation as a result of a motor drive 58 being triggered to reel-up or unreel the carrier rope 20. The motor drive 58 in this case is realized as an electric geared motor 60. A device for torque control 62 that acts in combination with the electric geared motor 60 enables a predefined rope tension to be maintained, such that excessive slack of the carrier rope 20 between the fleet vehicles 12, 16 can be avoided. The device for torque control 62 is a constituent part of an electric motor control system 66 that is connected to a control unit 64.

In addition, a rotary position transducer 68, for acquiring a drum rotation executed by means of the electric geared motor 60, is assigned to the winding drum 54, the control unit 64 extrapolating, from the number of acquired drum rotations, a current distance between the two base stations 14, 18. This distance information is used by the control unit 64 to acquire the relative movement of the two fleet vehicles 12, 16 and, by appropriate intervention in an autonomous vehicle control system 70, to coordinate the relative movement as required as part of a higher-order fleet management system. A sub-system 72, 74 of the autonomous vehicle control system 70 is assigned to each of the two fleet vehicles 12, 16, the two sub-systems 72, 74 exchanging with each other via the electric power cable or data transmission cable 22 by use of associated communication units 76, 78.

At the same time, the control unit 64 compares the relative distance of the two base stations 14, 18, obtained from the distance information, with the available total length of the carrier rope 20, or of the electric power cable or data transmission cable 22, with appropriate counter-measures, for avoiding damage to the carrier rope 20, or to the electric power cable or data transmission cable 22, being taken by the control unit 64 if a maximum distance, that to that extent is to be maintained, will imminently be exceeded. These measures include, besides the output of an operator alarm by triggering of a signal generator 80, a correcting intervention in the autonomous vehicle control system 70, possibly in the form of an automatically initiated emergency stopping of the fleet vehicles 12, 16.

For the purpose of coordinating the fleet vehicles 12, 16, the autonomous vehicle control system 70 additionally requires information relating to the spatial orientation of the fleet vehicles 12, 16. There is therefore a sensor means 82, 84 for acquiring a spatial course of the carrier rope 20 relative to the first or second base station 24, 18. The spatial orientation of the fleet vehicles 12, 16 in relation to each other is extrapolated by the control unit 64 from the acquired spatial course of the carrier rope 20. In the case of the embodiment represented, the sensor means 82, 84 is an angle sensor 86, 88 that is assigned to the respective base station 14, 18 and that senses the orientation of a contact feeler (not represented) that follows the course of the carrier rope 20. The angle sensor 88 comprised by the second base station 18 in this case is connected to the control unit 64, by means of the two communication units 76, 78, via the electric power cable or data transmission cable 22.

As shown by the representation of the electric power supply system 10 in FIG. 1, a separable connection means 90, for coupling and decoupling the carrier rope 20 and the electric power cable or data transmission cable 22, is provided on the second base station 18. The connection means 90 comprises a mechanical coupling 92, not shown in greater detail, for separably attaching the carrier rope 20, or a coupling socket 94 for establishing a separable electrical connection to a coupling plug 96 arranged on the electric power cable or data transmission cable 22.

A switching transducer arrangement 98, for identifying a coupling state of the carrier rope 20 and of the electric power cable or data transmission cable 22, is assigned to the connection means 90. In this case, operation of the fleet vehicles 12, 16 is enabled by the control unit 64 solely if it is established, on the basis of the identified coupling state, that both the carrier rope 20 and the electric power cable or data transmission cable 22 are attached, in the manner stipulated for use by means of the connection means 90.

The switching transducer arrangement 98 is an arrangement of mechanical contact switches or contactlessly operating induction switches, which are actuated upon the carrier rope 20 being attached to the mechanical coupling 92, or upon establishment of the electrical connection between the coupling plug 96 and coupling socket 94, and which provide coupling-state information, ensuing from the respective switching state, to the control unit 64. The coupling-state information in this case is transmitted to the control unit 64 by means of the two communication units 76, 78 via the electric power cable or data transmission cable 22.

A dummy connection element 100 assigned to the first base station 14 allows the coupling plug 96 provided on the electric power cable or data transmission cable 22 to be stored during transport. This is pertinent, inter alia, if the fleet group is broken up in order to bring the fleet vehicles 12, 16 to the next deployment location. The dummy connection element 100 is a blind socket 102, without electrical function, that is compatible with the coupling plug 96, and to which the coupling plug 96 of the electric power cable or data transmission cable 22 can be separably attached. This allows the coupling plug 96 to be secured against damage caused by movement during transport, and at the same time a housing comprised by the blind socket 102 protectively surrounds the contact elements of the coupling plug 96.

Assigned to the blind socket 102 is switching transducer 104, for identifying a coupling plug 96 attached thereto. Operation of the first fleet vehicle 12 is enabled by the control unit 64 solely if it is established, on the basis of plug-in state information provided by the switching transducer 104, that the coupling plug 96 is secured on the blind socket 102. The switching transducer 104 is a mechanical contact switch that is built into the blind socket 102, or a contactlessly operating induction switch that is actuated by the coupling plug 96 attached to the blind socket 102.

The electric power supply system 10 enables the electric power cable or data transmission cable 22 to be supported, by means of the carrier rope 20 above the ground, and thus out of the reach of mechanical influences. Since the tensile forces acting between the two fleet vehicles 12, 16 are taken up by the carrier rope 20, no particular demands in this regard are made on the mechanical loading capacity of the electric power cable or data transmission cable 22. In operation, the length of the carrier rope 20 can be freely adapted in the range between a minimum distance to be maintained from the two fleet vehicles 12, 16 and a maximum distance defined by the total length of the electric power cable or data transmission cable 22, making it possible to appropriately take account of dynamic travel or turning maneuvers of the fleet vehicles 12, 16. The electric power cable or data transmission cable 22 in this case is supported, by means of the holding elements 26-1, . . . , 26-6, so as to be displaceable along the carrier rope 20 such that it hangs down in loops 24 to a greater or lesser extent, depending on the length of the carrier rope 20. In view of this, the attachment point of the carrier rope 20 is typically located at a distance of 4 meters above the ground, the carrier rope 20, or the two base stations 14, 18, in this case being attached to masts 106, 108 connected to the fleet vehicles 12, 16.

The carrier rope 20 is composed of a multiplicity of metal wires or high-strength plastic fibers. The high-strength plastic fibers are aramid or Kevlar fibers.

The electric power cable or data transmission cable 22 is realized as a multicore copper or aluminum cable, which also has optical or coaxial conductors for broadband data transmission, or real-time data communication. The coaxial conductor is an Ethernet cable. To make it possible to dispense with the use of elaborate rotary contacts for data transmission with regard to the use of the winding drum 54, assigned to the winding drum 54 is a (co-rotating) data transceiver 110 that is connected to the communication unit 76 of the first fleet vehicle 12 via a wireless data exchange connection 112, in order for the data transmitted to this communication unit to be fed into the optical or coaxial conductor by means a corresponding interface, or for data transmitted via the latter to be received.

Following separation of the electrical connection of the electric power cable or data transmission cable 22, 26-1, . . . , 26-6 can be stowed on the first base station. For this purpose, following separation of the electric plug-in connection, the holding elements 26-1, . . . , 26-6 can be slid into one another along the carrier rope 20 and locked, by means of a securing element (not represented), in an end position provided on the first base station 14. The mechanical coupling 92 of the carrier rope 20 is then separated, and the latter is reeled-up onto the winding drum 54.

In order to simplify the stowage of the comparatively heavy electric power cable or data transmission cable 22 (which typically weighs up to 150 kg), the holding elements 26-1, . . . , 26-6, following the decoupling of the electric power cable or data transmission cable 22, may optionally be stowed by means of a return device (not represented) assigned to the first base station 14. The return device comprises a return rope that is connected to the outermost holding element 26-1 and that can be reeled-up onto a further winding drum that can be motor-driven, the outermost holding element 26-1 taking the inner holding elements 26-2, . . . , 26-6 along its path in the direction of the end position on the first base station 14, where it can be locked in place.

Figure 2:
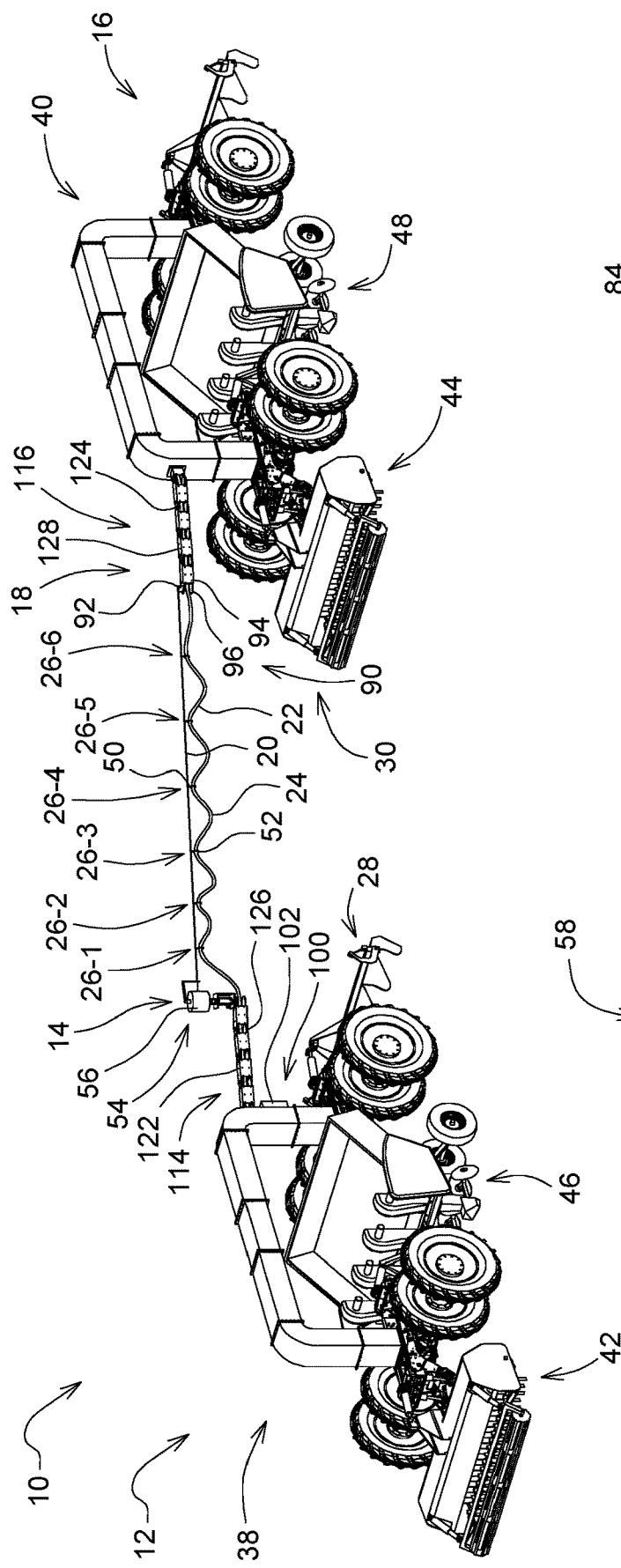
FIG. 2 is a schematic of a second exemplary embodiment of an electric power supply system for a vehicle fleet.

FIG. 2 shows a second embodiment of the electric power supply system according to the present disclosure. The latter differs from the first embodiment in respect of the attachment of the base stations 14, 18 to the respective fleet vehicle 12, 16.

Accordingly, to increase the safety distance in respect of the current-carrying electric power cable or data transmission cable 22, a drag chain 114, 116 is attached to the two base stations 14, 18. The carrier rope 20 is fastened to a free drag chain end 118, 120 by means of the winding drum 54, or to the separable connection means 90. In this way, the drag chain 114, 116 forms a spacer between the respective fleet vehicle 12, 14 and the electric power cable or data transmission cable 22, since the distance between the fleet vehicle 12, 16 and the hanging down loops 24 of the electric power cable or data transmission cable 22 is increased by the length of the drag chain 118, 120.

Unlike a conventional link chain, the drag chain 118, 120 is composed of a multiplicity of concatenated segments 122, 124, which are pivotally connected to each other via intermediate hinges, or joints 124. The hinges, or joints 126, 128, are designed in such a manner that a minimum radius, defined by the admissible flexural stress of the electric power cable or data transmission cable 22 guided in the drag chain 118, 120, cannot be undershot. The hinges, or joints 126, 128, are realized cardanically, such that the drag chain 118, 120 is able to follow the movements of the carrier rope 20 in any pivoting direction.

The realization of the sensor device 82, 84 also differs from that of the first embodiment. Thus, in the present case, a separate angle sensor 130, 132 is assigned to each of the hinges, or joints 126, 128, of the drag chain 118, 120. This takes account of the fact that the drag chain 118, 120, owing to the limited mobility of the individual segments 122, 124 in relation to each other, does not necessarily have a straight course that follows the carrier rope 20. Here, the actual course of the carrier rope 20 relative to the respective fleet vehicle 12, 16 could not be extrapolated by acquisition of the orientation of only a single one of the segments 122, 124.

If, as here, there is a separate angle sensor 130, 132 assigned to each of the hinges, or joints 126, 128, it is possible at the same time in the region of the drag chain 118, 120, to monitor the minimum radius of bend to be maintained for the electric power cable or data transmission cable 22, and if necessary appropriate counter-measures are taken by the control unit 64 to avoid kinking of the electric power cable or data transmission cable 22 on the basis of correcting interventions in the autonomous vehicle control system 70.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An electric power supply system for a vehicle fleet, comprising:
    a first base station configured to be attached to a first fleet vehicle;
    a second base station configured to be attached to a second fleet vehicle;
    a carrier rope spanning between the first and second base stations, the carrier rope being variable in length, and the first base station comprising a winding drum that is operably driven by a motor for altering the length of the carrier rope;
    a cable being operably run in loops on the carrier rope, the cable comprising a fixed length, and the cable is operably run via holding elements positioned along the carrier rope;
    a rotary position transducer configured to acquire a drum rotation of the winding drum operably driven by the motor;
    a control unit configured to extrapolate from the number of acquired drum rotations a current distance between the two base stations; and
    an autonomous vehicle control system configured to coordinate the relative movement between the first and second fleet vehicles;
    wherein the current distance between the two base stations is compared with a maximum length of the carrier rope, and if the current distance equals the maximum length of the carrier rope then the autonomous vehicle control system initiates a correcting intervention.

2. The electric power supply system of claim 1, wherein the cable comprises an electric power cable or a data transmission cable.

3. The electric power supply system of claim 1, wherein the holding elements comprise sliding or rolling guides to which a respective loop end of the cable is fixedly attached.

4. The electric power supply system of claim 1, further comprising a separable connection means for coupling and decoupling the carrier rope and the cable, the separable connection being disposed on the second base station.

5. The electric power supply system of claim 4, further comprising a switching transducer arrangement configured to identify a coupling state of the carrier rope and cable, the switching transducer arrangement being assigned to the connection means.

6. The electric power supply system of claim 4, wherein the first base station comprises a dummy connection element for storing, during transport, a coupling plug disposed on the cable.

7. The electric power supply system as claimed in claim 6, further comprising a switching transducer assigned to the dummy connection element for identifying a coupling plug attached thereto.

8. The electric power supply system of claim 1, wherein the carrier rope comprises a multiplicity of metal wires or high-strength plastic fibers.

9. The electric power supply system of claim 1, further comprising a drag chain attached to at least one of the two base stations, the carrier rope being fastened to a free drag chain end via a winding drum or a separable connection means.

10. The electric power supply system of claim 1, further comprising:
    a sensor device configured to acquire a spatial course of the carrier rope relative to the first or second base station;
    a control unit configured to extrapolate from the acquired spatial course of the carrier rope the spatial orientation of the fleet vehicles in relation to each other.

11. The electric power supply system of claim 1, wherein the holding elements are disposable on the first base station after decoupling the cable.

12. The electric power supply system of claim 11, wherein the holding elements are stowed on the first base station via a return device assigned to the first base station.

13. The electric power supply system of claim 1, wherein the correcting intervention comprises automatically stopping the first and second fleet vehicles.

14. The electric power supply system of claim 1, further comprising:
    a signal generator which triggers an operator alarm when the current distance equals the maximum length of the carrier rope.

15. A vehicle fleet, comprising:
    a first fleet vehicle and a second fleet vehicle;

an electric power supply system equipped on each of the first and second fleet vehicles, the electric power supply system comprising a first and a second base station;

the first base station configured to be attached to a first fleet vehicle;

the second base station configured to be attached to a second fleet vehicle;

a carrier rope spanning between the first and second base stations, the carrier rope being variable in length, and the first base station comprising a winding drum that is operably driven by a motor for altering the length of the carrier rope;

a cable being operably run in loops on the carrier rope, the cable comprising a fixed length, and the cable operably run via holding elements positioned along the carrier rope;

a rotary position transducer configured to acquire a drum rotation of the winding drum operably driven by the motor;

a control unit configured to extrapolate from the number of acquired drum rotations a current distance between the two base stations; and an autonomous vehicle control system configured to coordinate the relative movement between the first and second fleet vehicles;

wherein the current distance between the two base stations is compared with a maximum length of the carrier rope, and if the current distance equals the maximum length of the carrier rope then the autonomous vehicle control system initiates a correcting intervention.

16. The vehicle fleet of claim 15, wherein the holding elements comprise sliding or rolling guides to which a respective loop end of the cable is fixedly attached.

17. The vehicle fleet of claim 15, further comprising a separable connection means for coupling and decoupling the carrier rope and the cable, the separable connection being disposed on the second base station.

18. The vehicle fleet of claim 15, wherein the correcting intervention comprises automatically stopping the first and second fleet vehicles.

19. The vehicle fleet of claim 15, further comprising:

a signal generator which trigger an operator alarm when the current distance equals the maximum length of the carrier rope.

* * * * *